(12) United States Patent
Hargett et al.

(10) Patent No.: US 7,359,906 B1
(45) Date of Patent: *Apr. 15, 2008

(54) METHOD FOR DEVELOPING DATA WAREHOUSE LOGICAL DATA MODELS USING SHARED SUBJECT AREAS

(75) Inventors: Kim Nguyen Hargett, Ramona, CA (US); Stephen A. Brobst, Henderson, NV (US); Pieter Lessing, Los Angeles, CA (US); William A. Matera, Farmingdale, NJ (US); Mark L. Crosby, Venice, CA (US); Lily W. Young, Escondido, CA (US)

(73) Assignee: NCR Corp., Dayton, OH (US)

( * ) Notice: Subject to any disclaimer, the term of this patent is extended or adjusted under 35 U.S.C. 154(b) by 283 days.

This patent is subject to a terminal disclaimer.

(21) Appl. No.: 10/735,952

(22) Filed: Dec. 15, 2003

(51) Int. Cl.
*G06F 17/00* (2006.01)
(52) U.S. Cl. .................. 707/100; 707/104.1
(58) Field of Classification Search .... 707/100–103 R, 707/103 Y, 1–4, 104.1, 200, 10; 705/1, 5, 705/14, 7, 10, 26–28; 709/223, 224, 217
See application file for complete search history.

(56) References Cited

U.S. PATENT DOCUMENTS 5,970,476 A * 10/1999 Fahey ......................... 705/28
5,991,740 A * 11/1999 Messer ........................ 705/27
6,023,679 A * 2/2000 Acebo et al. ................... 705/5
6,128,624 A * 10/2000 Papierniak et al. ....... 707/104.1
6,151,601 A * 11/2000 Papierniak et al. ........... 707/10
6,167,405 A * 12/2000 Rosensteel et al. ......... 707/102
6,385,592 B1 * 5/2002 Angles et al. ................ 705/14
2001/0041995 A1* 11/2001 Eder ............................. 705/7

OTHER PUBLICATIONS

NCR, E-Business Teradata @ctive Warehouse 2.0 Installation and Customization Guide, Jun. 2000.*
Silberschatz et al., Database System Concepts, 1998, pp. 1-59.*
Yuhong Guo et al., Triple-driven data modeling methodology in data warehousing: a case study, Nov. 2006, ACM, pp. 59-66.*
Elisa Bertino et al., A logical framework for reasoning about access control models, Feb. 2003, ACM, vol. 6, Issue 1, pp. 71-127.*
Angela Bonifati et al., Designing data marts for data warehouses, Oct. 2001, ACM, vol. 10, Issue 4, pp. 452-483.*

* cited by examiner

*Primary Examiner*—Jeffrey Gaffin
*Assistant Examiner*—Jacques Veillard
(74) *Attorney, Agent, or Firm*—James M. Stover

(57) ABSTRACT

A logical data model (LDM) design methodology that utilizes common or shared subject areas, developed for applications across two or more industries, in the design and construction of data warehouse solutions and logical data models for specific customers. The development and use of shared subject areas provides for more effective new LDM development through re-use of common elements and quicker deployment of horizontal applications on all industries.

10 Claims, 7 Drawing Sheets

METHOD FOR DEVELOPING DATA WAREHOUSE LOGICAL DATA MODELS USING SHARED SUBJECT AREAS

FIELD OF THE INVENTION

The present invention relates generally to Data Warehouse solutions, and more particularly, to the design and construction of logical data models that define the data elements can be stored in the data warehouse and how they relate to one another.

BACKGROUND OF THE INVENTION

NCR Corporation has developed, and continues to develop and improve, data warehouse solutions and applications for numerous industries such as the Communications, Travel and Transportation, Retail, E-Business, Financial Services and Insurance, and Manufacturing industries.

The Enterprise Data Warehouse (EDW) has proved a strategic weapon for most modern organizations. It should be active, dynamic and flexible in order to cope with changing business requirements. It should provide a strategic background to support changing business relationships.

The foundation of the enterprise data warehouse is a comprehensive and responsive logical data model addressing challenges in the near future without compromising existing business processes. A logical data model is a graphical representation of the way data is organized in a data warehouse environment. The logical data model specifically defines which individual data elements can be stored and how they relate to one another to provide a model of the business information. The data model ultimately defines which business questions can be answered from the data warehouse and thus determines the business value of the entire decision support system.

A properly designed LDM provides a foundation for more effective sales, marketing, and customer management; and supports customer relationship management (CRM) requirements related to identifying, acquiring, retaining and growing valuable customers. A logical data model reflects the operating principles and policies of a business and provides the underlying structure for the data imported into the data warehouse, in the following ways:

It serves as a road map for achieving data integration in an organization. It is a guide for development over the long term.

It provides a neutral cross-functional view, not Accounting's view or Marketing's view.

It shows interlocking parts. Expanding the model for future enhancements is a lot easier if you understand all the interdependent parts.

It is a foundation upon which to build applications or business views.

It is a tool that allows an organization to recognize and control data redundancy. Data redundancy can lead to inaccurate and inconsistent reporting of business information.

It allows an organization to see relationships between data elements.

It is the starting point for developing a physical database design.

It aids the communication between an analyst and the business user.

It is a rigorous technique that imposes discipline on the warehouse development process and leads to the development of stable, robust, long term and reliable solutions.

A model is a communication tool—it allows an organization to understand their data warehouse, prior to, during and after implementation.

Different industries have different information requirements, data sources, data uses and accordingly, data warehouse requirements. Each industry data warehouse solution is constructed in accordance with a different logical data model. Even within the same industry, different customer requirements will result in different logical data model structures.

As stated earlier, NCR Corporation has developed data warehouse solutions and applications for numerous industries. Logical data models for several of these data warehouse solutions are described in the following patent applications:

U.S. patent application Ser. No. 09/838,101, filed on Feb. 14, 2001, describes a logical data model for the Communications industry. The application, titled "LOGICAL DATA MODEL FOR COMMUNICATIONS INDUSTRY CUSTOMER RELATIONSHIP MANAGEMENT," is incorporated herein by reference.

U.S. patent application Ser. No. 09/921,566, filed on Aug. 6, 2001, describes a logical data model for the Airline industry. The application, titled "COMPUTER IMPLEMENTED CUSTOMER VALUE MODEL IN AIRLINE INDUSTRY," is incorporated herein by reference.

U.S. patent application Ser. No. 09/990,539, filed on Nov. 16, 2001, describes a logical data model for the E-Business industry. The application, titled "SYSTEM AND METHOD FOR CAPTURING AND STORING INFORMATION CONCERNING WEB VISITOR BROWSING ACTIVITIES IN A DATA WAREHOUSE," is incorporated herein by reference.

U.S. patent application Ser. No. 10/017,146, filed on Dec. 14, 2001, describes a logical data model for the Retail industry. The application, titled "SYSTEM AND METHOD FOR CAPTURING AND STORING INFORMATION CONCERNING RETAIL STORE OPERATIONS," is incorporated herein by reference.

U.S. patent application Ser. No. 10/027,967, filed on Dec. 21, 2001, describes a logical data model for the Travel and Transportation industry. The application, titled "SYSTEM AND METHOD FOR CAPTURING AND STORING BUSINESS INFORMATION FOR THE TRAVEL AND TRANSPORTION INDUSTRIES," is incorporated herein by reference.

U.S. patent application Ser. No. 10/190,099, filed on Jul. 3, 2002, describes a logical data model for the Financial industry. The application, titled "SYSTEM AND METHOD FOR CAPTURING AND STORING FINANCIAL MANAGEMENT INFORMATION," is incorporated herein by reference.

As apparent from a review of the above referenced logical data models, the development and modification of logical data models requires extensive business knowledge, customer collaboration, and use of development resources. A method for simplifying and improving logical data model development and reducing the amount of time and resources required in the development process is desired.

SUMMARY OF THE INVENTION

It is an object of the present invention to provide a new and useful system and method for capturing, storing and organizing information within a data warehouse.

It is a further object of the present invention to provide a new and useful method for constructing logical data models.

The foregoing objects are accomplished through implementation of a logical data model design methodology that utilizes common or shared subject areas, developed for applications across two or more industries, in the design and construction of data warehouse solutions and logical data models for specific customers. The development and use of shared subject areas provides for more effective new LDM development through re-use of common elements and quicker deployment of horizontal applications on all industries.

The method described herein includes the steps of developing at least one shared subject area, said shared subject area comprising a plurality of entities and relationships defining the manner in which basic information common to two or more industries is stored within a database; and including said shared subject area within said logical data model for a data warehouse customer from one of the two or more industries.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein.

BEST MODE FOR CARRYING OUT THE INVENTION

Backbone for Decision Support Systems

Figure 1:
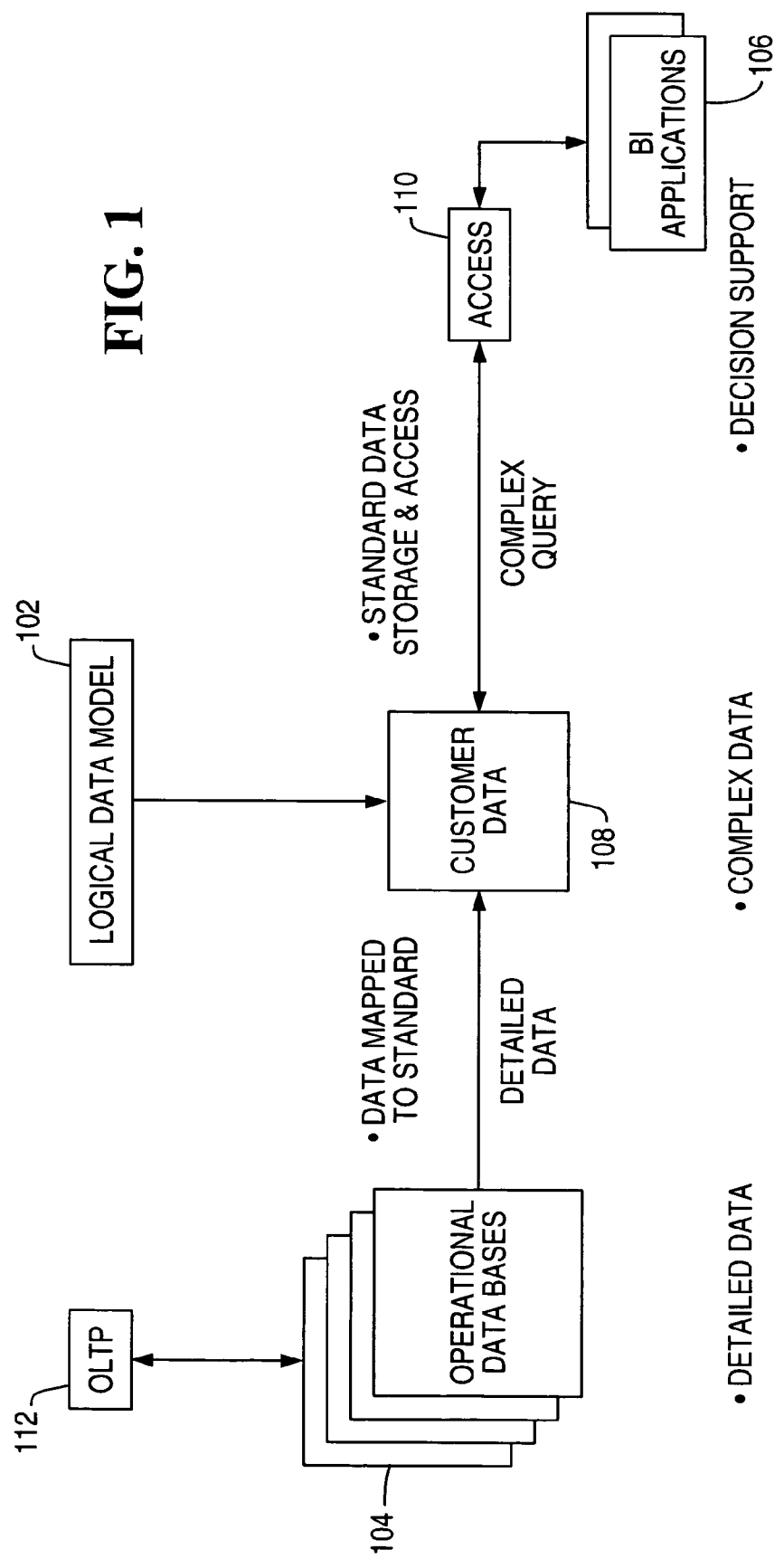
FIG. 1 is a high level functional diagram of an enterprise data warehouse decision support system incorporating a logical data model.

FIG. 1 is a high level diagram of how a logical data model 102 relates to operational databases 104 and business intelligence applications 106, e.g., decision support systems. Decision support systems provide users with the ability to quickly analyze large amounts of customer data. For example, users use decision support tools to perform trend analysis on sales and financial information or to drill down into masses of sales statistics to isolate the most volatile products.

The logical data model 102 provides the backbone for the decision support components of Customer Relationship Management. The logical data model 102 provides the capability to support huge amounts of detailed data in the data warehouse, analyze it using standard, ad hoc, and forecasting queries, and answer the following types of business questions: What happened? Why did it happen? What will happen?

As shown in FIG. 1, customer data 108 is the central focus of the customer relationship management system. Customer data 108 is accessed by business intelligence applications 106 via a standard data storage and access component 110 and organized according to logical data model 102. On-line transaction processing (OLTP) 112 interacts with operational databases 104 containing data which is mapped to the customer data 108.

OLTP 112 is processing transactions as the transactions are received by the computer. Also called "online" or "real-time" systems, transaction processing means that master files are updated as soon as transactions are entered at terminals or received over communications lines. It also implies that confirmations are returned to the sender.

Organizations increasingly rely on computers to keep everything up-to-date all the time. A manager might need to know how many items are left on the shelf, what the latest price of a stock is or what the value of a financial portfolio is at any given moment.

This decision support system shown in FIG. 1 is designed to contain very large volumes of detail data that are maintained for long periods of time. This is particularly important to communications service providers for developing experience and profitability on customer segments, member segments, product lines, and providers. The detail data is intended to capture the complete record of customer transactions. Detailed transactions are sourced from operational systems and contain all relevant elements in the customer transaction.

The communications data environment is complex and extensive. The logical data model's focus is on customers, contracts, products, transactions, market channels, and marketing campaigns. Although the logical data model does not encompass the general administrative or institutional investment areas of the enterprise, it can be extended to these areas and others without compromise.

Hardware Overview

Figure 2:
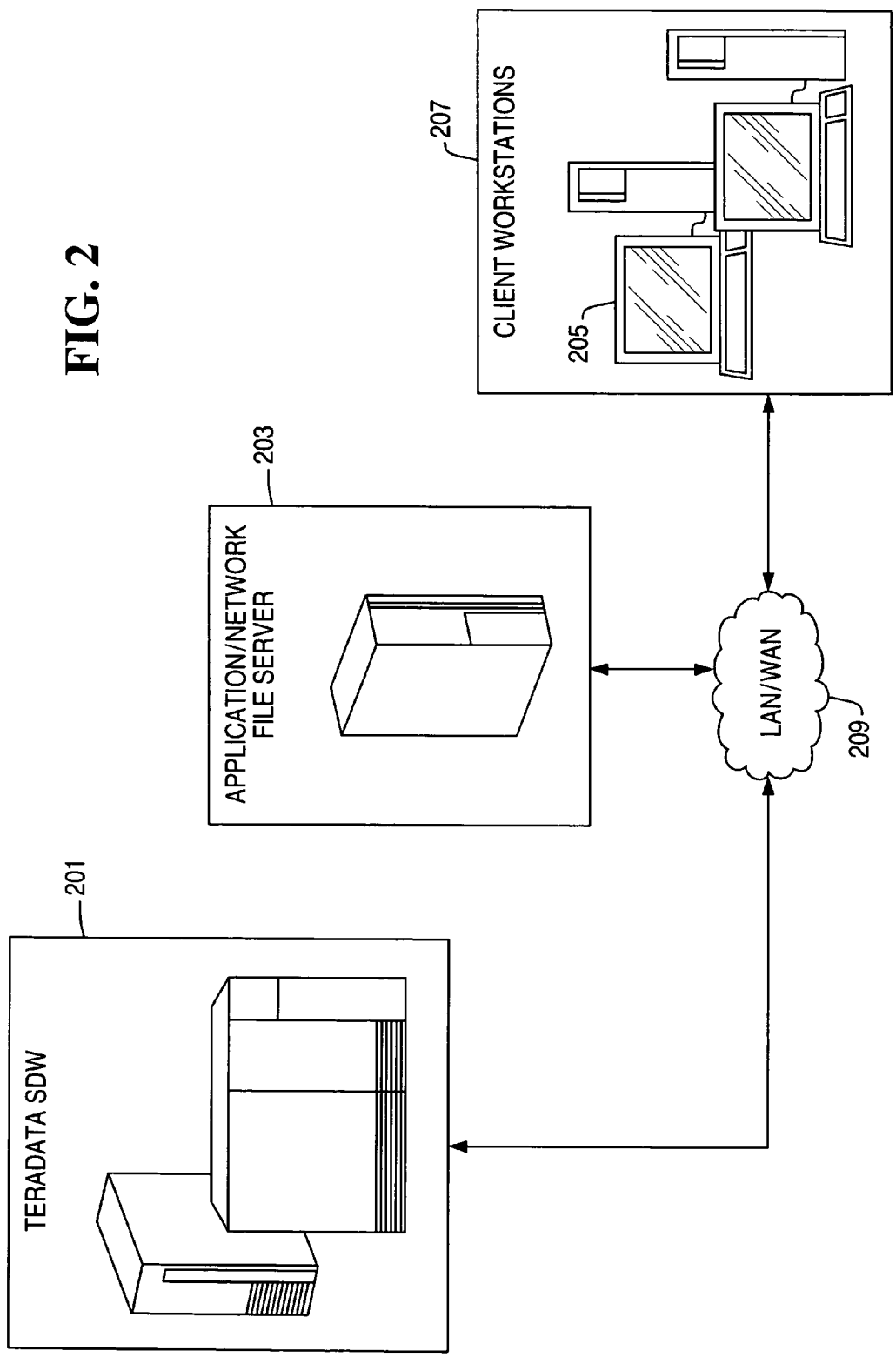
FIG. 2 provides an overview of the hardware components of an enterprise data warehouse solution.

FIG. 2 provides an overview of the hardware required for a data warehouse solution. The basic components consist of an NCR Corporation Teradata Scalable Data Warehouse 201, and administrative server 203, and client and administrative workstations 205 and 207, respectively. The components communicate with each other through a Local Area Network (LAN) or Wide Area Network (WAN), identified by reference numeral 209.

The system shown in FIG. 2 may support a communications provider customer-centric warehouse 201 as defined by the Communications Logical Data Model, described below. The application server 203 supports customer relationship management applications, such as NCR Corporation's Customer Business Intelligence (CustomerBI), SpotLIGHT, NCR CRM and FraudSENTRY applications. The solution requires a client workstation 205 for the solution administrator and workstation 207 for the marketing analyst. If only one workstation is available, separate access paths may be configured to the applications for the solution administrator and to the applications for the marketing analyst.

Software Overview

Figure 3:
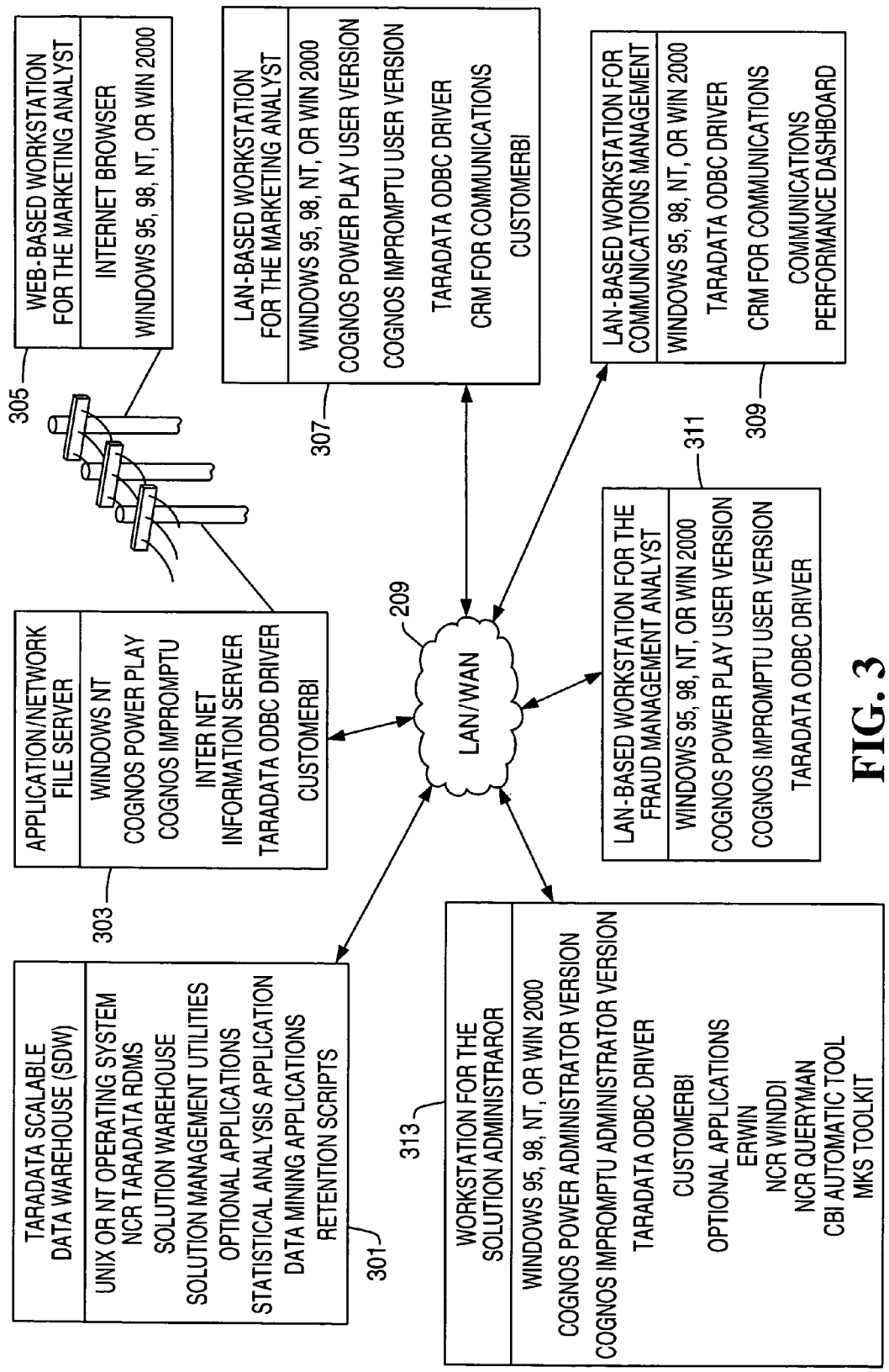
FIG. 3 provides an overview of the software components of an enterprise data warehouse solution.

FIG. 3 provides an overview of the software components that make up an exemplary knowledge management solution for a communications provider. The Communications logical data model defines the structure of the communications provider customer-centric database residing on Teradata SDW. The software components illustrated include the following data warehouse components 301: an NCR Teradata Relational Database Management System (RDMS) operating on a UNIX or Microsoft Windows NT operating system; solution warehouse utilities, statistical analysis applications, data mining applications, and retention scripts.

Application/Network File Server components 303 include: Microsoft Corporation Windows NT operating system, Cognos Incorporated Impromptu® report and query generation tool, Cognos Incorporated PowerPlay® data mining and report generation tool, internet information server software, Teradata ODBC Drivers, and NCR Corporation CustomerBI application.

Marketing Analyst Web-Based Workstation components 305 include: Microsoft Corporation Windows 95, 98, NT, or Win 2000 operating system, and an internet browser application.

Marketing Analyst LAN-Based Workstation components 307 include: Cognos Incorporated Power Play User Version, Cognos Incorporated Impromptu User Version, Teradata ODBC drivers, NCR Corporation CustomerBI application, NCR Corporation CRM for Communications application, and Microsoft Corporation Windows 95, 98, NT, or Win 2000 operating system software.

Communications Management LAN-Based Workstation 309 components include: Microsoft Corporations Windows 95, 98, NT, or Win 2000 operating system, Teradata ODBC Drivers, NCR Corporation CRM for Communications application, and Communications Performance Dashboard.

Fraud Management Analyst LAN-Based Workstation 311 components include: Cognos Incorporated Power Play User Version, Cognos Incorporated ImpromptuUser Version, Teradata ODBC drivers, and Microsoft Corporation Windows 95, 98, NT, or Win 2000 operating system software.

Solution Administrator Workstation 313 software components include: Cognos Incorporated Power Play Administrator Version, Cognos Incorporated Impromptu Administrator Version, Teradata ODBC drivers, NCR Corporation CustomerBI appication, and Microsoft Corporation Windows 95, 98, NT, or Win 2000 operating system software. Additional applications may include Platinum Technologies, Inc. ERWIN database modeling application, NCR Corporation WINDDI and Queryman applications, CBI Automation Tool, and MKS Toolkit software.

Data Sources

In the logical data model, the communications services provider's internal databases provide most of the data loaded into the warehouse. Generally the internal databases can be divided into the following categories:

Account data including information associated with the financial business transactions and financial records related to the preparation of statements concerning the operating results of the business. Likely source: Billing System.

Advertising data including information regarding company-sponsored campaign and product promotions. Likely source: Marketing systems.

Contract data including information associated with the agreement between a CSP and its customers. Likely source: Order Entry systems.

Offering data including information about the products and services being offered, the geographical area in which they are offered, etc. Likely source: Marketing systems.

Party data including information about any person, business, group or association of interest or involved with the communications services provider. Likely source: Marketing Systems or an external data provider (as described below).

Revenue data including the billing information associated with a customer's use or subscription to a product offering. Likely source: Billing Systems.

The logical data model may also incorporate data imported from sources external to the communications services provider, including, for example, the following:

Firmographic and business credit data, which is detailed data about the business customer. This information may be obtained from Dun & Bradstreet (www.dnb.com).

Census data, which includes detailed statistical information about the population and economy of geographical areas. Census data can usually obtained as a report from Acxiom Corporation (www.axciom.com).

Psychographic data, which includes detailed information about residential households. This information may also be obtained as part of the census report from Acxiom Corporation.

Contact lists, which are often available form the Polk Company (www.polk.com).

Logical Data Model Design Basics

As stated earlier, a properly designed logical data model provides a foundation for more effective sales, marketing, and operations management and supports the customer relationship management requirements related to identifying, acquiring, retaining and growing valuable customers.

A logical data model (LDM) is an abstract construct that is physically realized in the database or data warehouse. The data model provides an architecture for the information that will be included in a data warehouse. The database provides the physical realization of that architecture in a form that can be efficiently maintained and used. There may well be some differences between the logical data model and the final database design. The database may include some tables (summary tables, etc.) or columns that have no direct correlation in the logical data model. Elements in the logical model may be grouped differently in the physical database.

Figure 4:
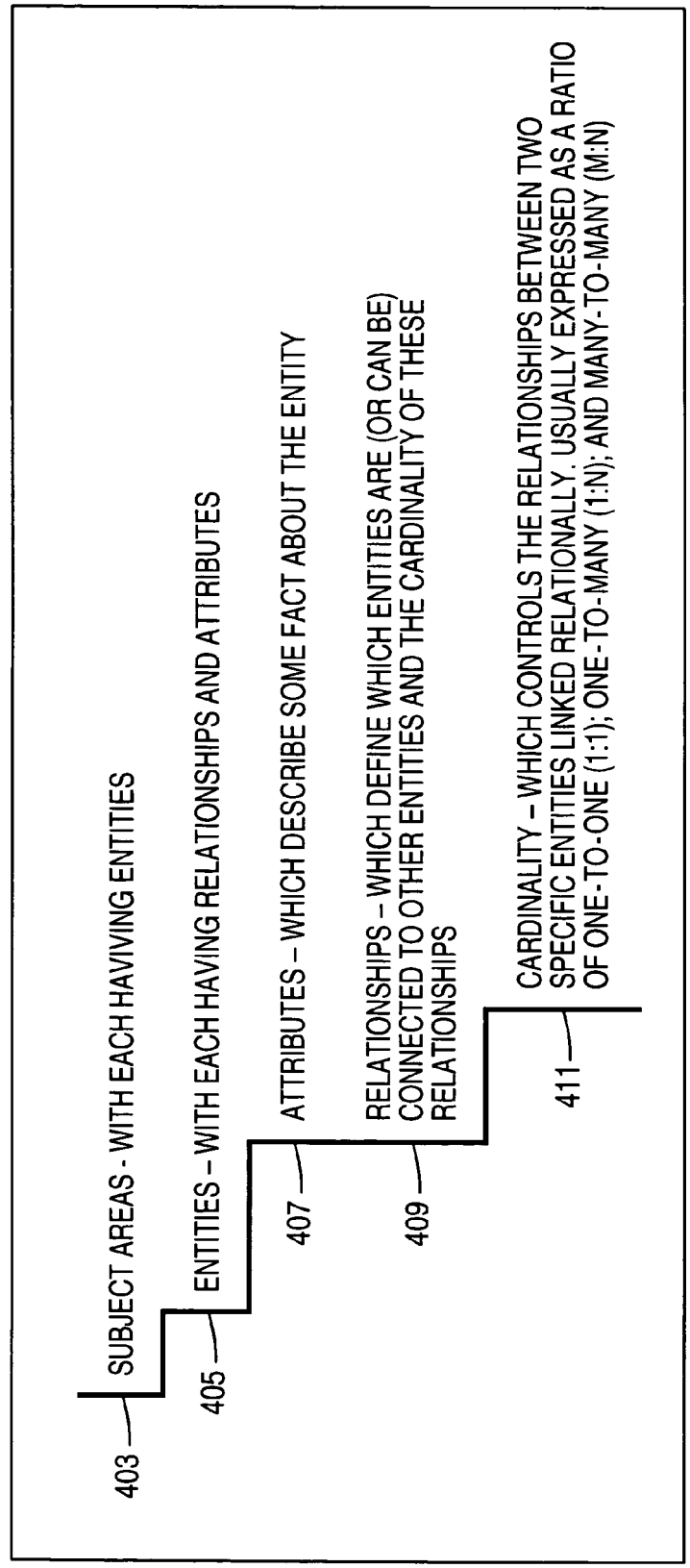
FIG. 4 is a diagram of a data model hierarchy.

A logical data model is organized by Subject Areas, each comprised of numerous Entities, Attributes and Relationships, as illustrated in FIG. 4. The data model hierarchy includes one or more Subject Areas 403. The Subject Areas 401 include one or more Entities 405 each having attributes 407 and relationships 409. Relationships 409 between two or more Entities 405 are further defined by Cardinality 411. The Relationships 409 define which entities are connected to other entities and the cardinality of the relationships. The Attributes 407 describe a fact about the Entity 405. Each of these elements will be described in greater detail below.

Subject Area

A subject area is a subset of objects taken from the universe of data objects for a particular line of business or industry that focus on a particular Business Process. Typically, a subject area is created to help manage large data architectures that may encompass multiple business processes or business subjects. This is the highest-level data concept within a conceptual entity/relationship (E/R) model. Working with subject areas is especially useful when designing and maintaining a large or complex data model. Dividing the enterprise into several distinct subject areas allows different groups within an organization to concentrate on the processes and functions pertinent to their business area.

Entity

An Entity represents a person, place, thing, concept, or event (e.g. PARTY, ACCOUNT, INVOICE, etc.). It represents something for which the business has the means and the will to collect and store data. An Entity must have distinguishable occurrences, e.g., one must be able to uniquely identify each occurrence of an entity with a primary key (e.g. Party Identifier, Account Identifier, Invoice Number, etc.). An Entity is typically named with a unique singular noun or noun phrase (e.g., PARTY, BILLING STATEMENT, etc.) that describes one occurrence of the Entity and cannot be used for any other Entity. It should be exclusive of every other Entity in the database. An Entity cannot appear more than once in the conceptual entity/relationship (E/R) model. Each Entity may have relationships to other Entities residing in its own Subject Area or in other Subject Areas.

Attribute

An Attribute is a data fact about an Entity or Relationship. It is a logical (not physical) construct. It is data in its atomic form. In other words, it is the lowest level of information that still has business meaning without further decomposition. An example would be FIRST NAME, or LAST NAME. An example of an invalid attribute would be PERSON NAME if it includes both the first and last names, as this could be further decomposed into the separate, definable (first name, last name) data facts.

Relationship

A Relationship is an association that links occurrences of one or more Entities. A Relationship must connect at least one Entity. If only one Entity is connected, the Relationship is said to be Recursive. A Relationship is described by a noun or passive verb or verb phrase that describes the action taken in the Relationship. A Relationship represent a static state of being between the occurrences of the Entities it connects. Relationships are not intended to represent processes or data flows. They cannot be linked to another Relationships. They may optionally represent future, present, and/or past relatedness. The time frame must be explicitly defined in the data definition. Relationships may contain attributes. In a normalized model, a Relationship containing Attributes will result in the creation of an Entity.

Cardinality

In order for a data model to be considered accurate, it must contain both the maximum and minimum number of Entity occurrences expected. This is controlled by rules of cardinality, which describes a relationship between two Entities based on how many occurrences of one Entity type may exist relative to the occurrence of the other Entity. Typically, it is a ratio, commonly depicted as a one-to-one (1:1); one-to-many (1:N); and many-to-many (M:N) relationship.

The maximum cardinality may be an infinite number or a fixed number but never zero. The minimum cardinality may be zero, or some other positive number, but it must be less than or equal to the maximum cardinality for the same relationship.

Illustrative logical data models for the Communications Industry and E-Business Industry will now be described.

EXAMPLE 1

Communications Industry Logical Data Model

Figure 5:
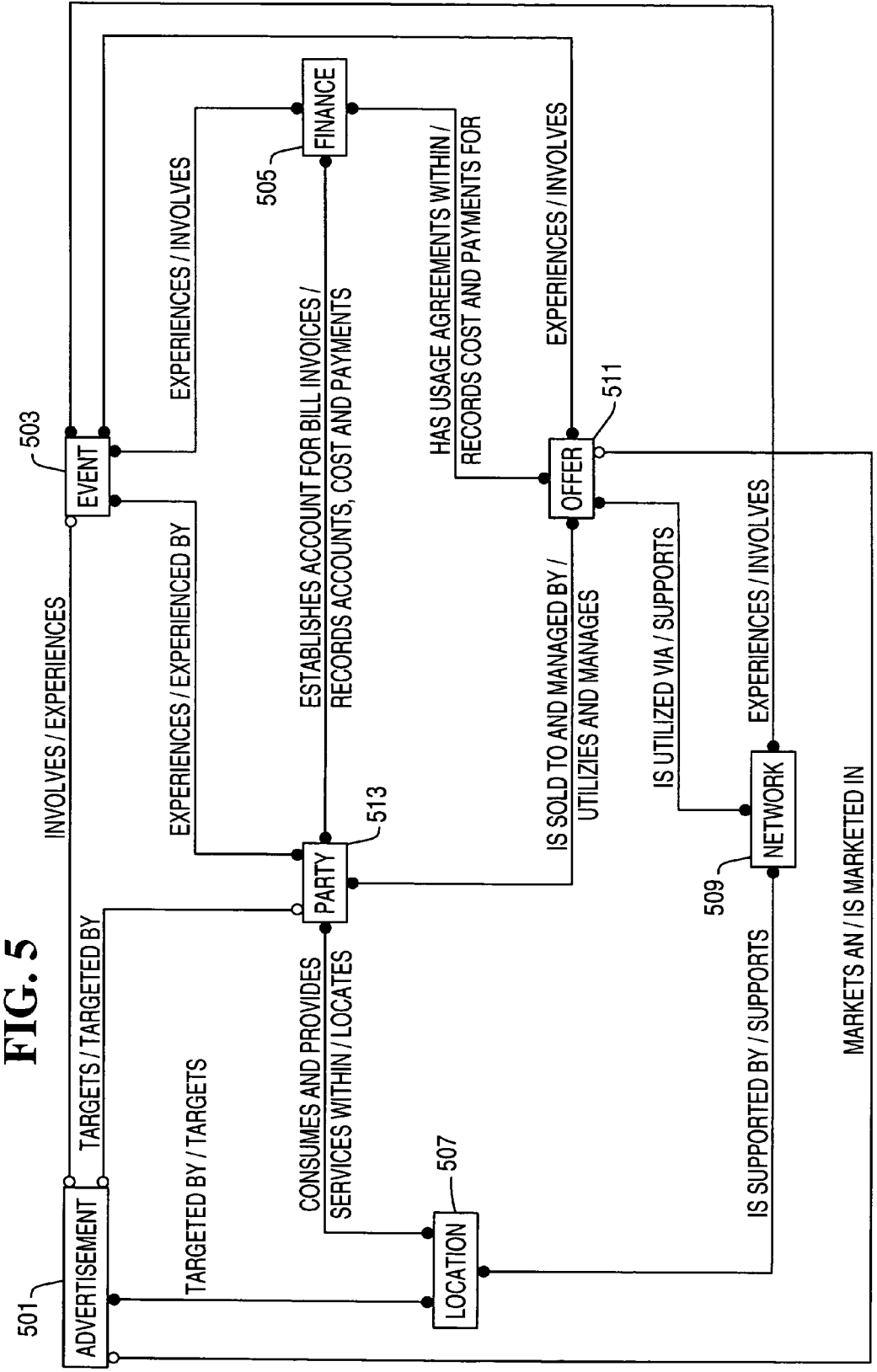
FIG. 5 is a subject area model of a communications industry logical data model.

FIG. 5 is a subject area model of the Communications Industry logical data model, illustrating the subject areas included within the LDM. The Subject Area Model is a one page over-view that defines, at a high level, the scope and data requirements of the solution. Each facet within the logical data model will be illustrated in the Figures and described in greater detail below.

The subject area model shown in FIG. 5 depicts the major relationships between subject areas. The boxes represent the subject areas. Each line represents a relationship between subject areas. The solid circle at the end of a relationship line represents the target of a 'many' relationship. For example, the relationship between LOCATION and PARTY is many-to-many. A LOCATION can be related to one or many PARTIES and a PARTY can have zero, one or many LOCATIONS. Only the major relationships are shown in this diagram.

The major subject areas are defined below:

Advertisement

The Advertisement subject area 501 contains information about the strategic sales and information gathering initiatives that are used by the Communications Service Provider to support their business objectives. Information can be captured that will enable the Communications Service Provider to create, manage and measure information on campaigns and responses by individual to track campaign effectiveness over time. Information about Surveys, the Scripts used by a Survey, the logistics and conditions that existed when the Survey was conducted, and the results of the Survey can also be captured. Detailed information about the Contact Lists that are utilized by a Campaign or a Survey is also included.

Event

The Event subject area 503 contains information regarding the occurrences of significant incidents to provide business users with a complete view of the customer lifecycle across different stages of their relationship with the company. Events may be used by the Communications Service Provider for such purposes as tracking Customer Service, initiating special Promotions and Campaigns, and targeting Customers or other Parties and Accounts to a particular Campaign because they where affected by an Event.

Detailed information about an Event, such as the reasons for the Event, how the Event was resolved, the category of the Event, all involved Parties, and the relationships that can exist between Events, can also be captured. There are many types of Events that may occur, for example Event may include a Contact, a Service Order, a Billing Statement Adjustment, a Fraud event based on subscription or call usage, or even a geographic occurrence such as a power outage, service disruption, or regional holiday.

The Event entities enable Marketing and Sales to determine and track key factors related to churn and growth. Event and status changes can trigger marketing actions such as win-back, cross-sell or up-sell campaigns. For example, contract expiration within 60 days may trigger a renewal notice and subsequent direct mail or calls to retain the customer.

Finance

The Finance subject area 505 contains Account, Billing, Payment, Other Revenue and Cost Information. Accounts are relationships that exist between the Communications Service Provider and a Customer at the bill invoice level. Historical billing information is represented via the Invoices that are generated by the Communications Service Provider to Accounts for goods and services rendered. A history of the Payments made to satisfy the Invoices is also captured. Costs can be one-time charges that are incurred on a specific date or they may be charged over a period of time. There are many types of Costs that can be captured, and each type of cost is classified by a Cost Item Category.

"How much and how long" are the basis for the Finance part of the model. The model takes key aspects of the call information and provides relationships to give new insight into Revenue and Usage patterns. Affinities between the usage and revenue, products and customers become visible, extending the understanding of the "how and why" of customer use. Combined with the other components of the model, the billing and usage detail allows marketers to find the most profitable product bundles and customized services for infinite segments or individuals.

Location

The Location subject area 507 provides the Addresses and geographical areas that are important to the Communications Service Provider. Addresses and geographical areas are used to locate customers and equipment, provide customer listings, target marketing campaigns, specify product availability's, and support artificially created boundaries such as Sales Districts and Test Markets for sales and management purposes. The Location subject area also provides for the capturing of historical demographic data about a geographical area.

Network

The Network subject area 509 provides data on how the customer accesses the products and services offered by the Communications Service Provider and provides rudimentary information about the physical equipment that is used to provide those services. Detailed data also exists, at a Mediated and Rated Call level for both wireline and wireless, about how and when a Customer utilizes a product or service. The Network subject area also includes placeholders for Fraud Profiling.

Offer

The Offer subject area 511 provides information about the Products or Product Packages (Offerings) that are sold by the Communications Service Provider and consumed by their customers.

Information is captured about the terms and conditions associated with an Offering, the Contracts that cover an Offering, the Promotions that are used as incentives to buy an Offering, and a history of those Offerings to which a Customer subscribes.

The Offer subject area enables any depth or number of product hierarchies. This allows marketers to provide unlimited product and service bundling to meet any customer segments' needs. The Offer subject area splits arcane product structures down to their simplest components (product hierarchy, product, capability, and rates) for easily answering product performance or product projection (what if) questions.

Party

The Party subject area 513 contains information about any person, business, group, or association that is of business interest or is involved with the Communications Service Provider. Each Party will have one or more roles, which will designate why that Party is of business interest to the Communications Service Provider. A history of these roles will be recorded for each role that a Party fulfills. For example, a customer is a Party that buys or uses the company's products or services and actually or potentially generates revenue. This same Party may also be a vendor who sells goods and services to the Communications Service Provider.

Extensive historical information about a Party, such as the Awards Programs that they participate in, Demographic Profiling including unlimited types of demographic, psychographic, and firmagraphic data and Segmentation including scores such as propensity to churn, propensity to buy, or customer worth can also be captured.

Additional details concerning the communications industry logical data model described above are provided in U.S. patent application Ser. No. 09/838,101, titled "LOGICAL DATA MODEL FOR COMMUNICATIONS INDUSTRY CUSTOMER RELATIONSHIP MANAGEMENT," by M. Lundhoj et al. and filed on Apr. 19, 2001.

EXAMPLE 2

E-Business Logical Data Model

Figure 6:
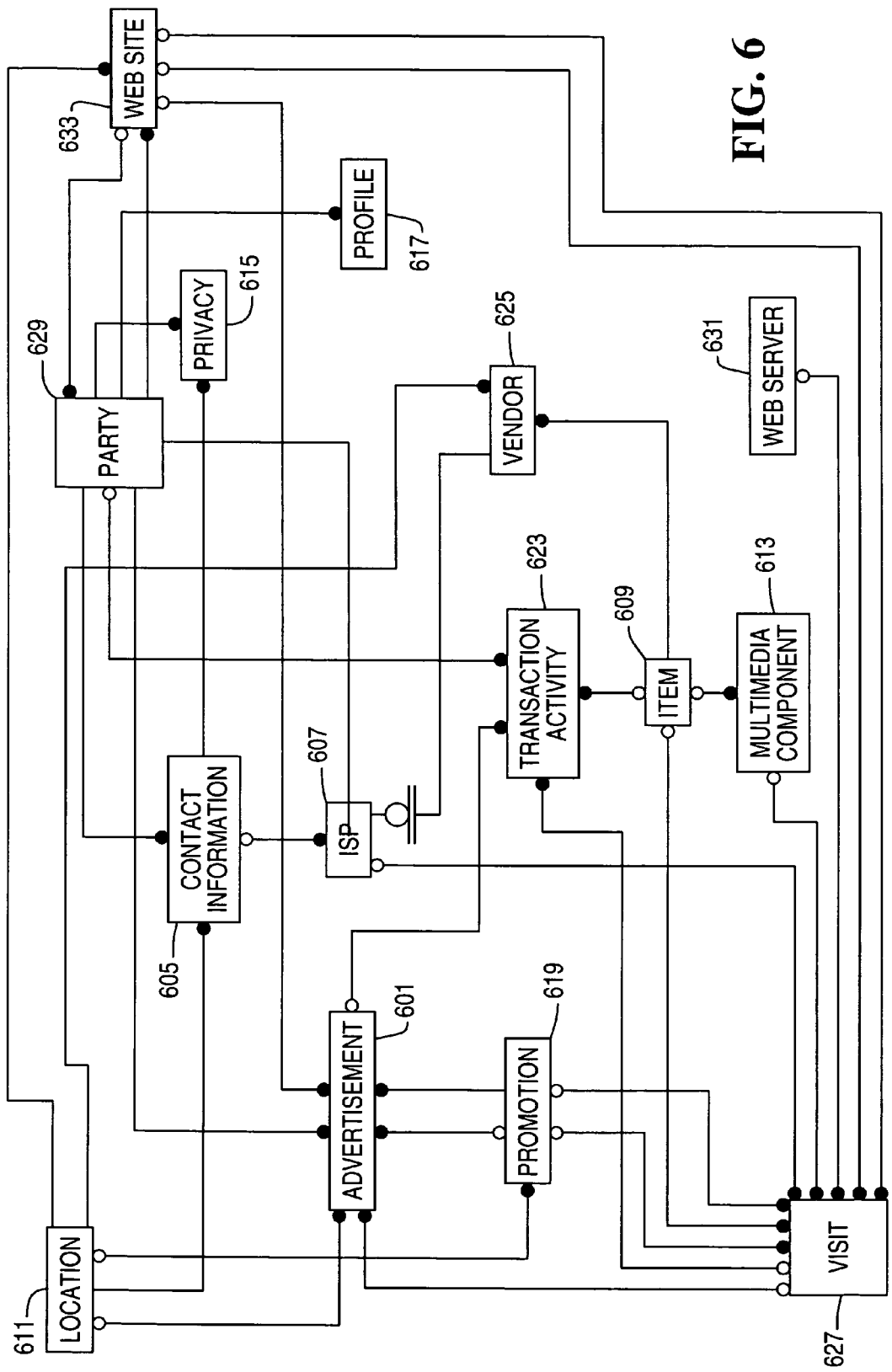
FIG. 6 is a subject area model of a logical data model for the E-Business industries, illustrating the subject areas included within the LDM.

FIG. 6 is a subject area model of a logical data model for the E-Business industries, illustrating the subject areas included within the LDM. The Subject Area Model is a one-page overview that defines, at a high level, the scope and data requirements of the solution.

The subject area model shown in FIG. 6 illustrates some of the major relationships between subject areas. The boxes represent the subject areas. Each line represents a relationship between subject areas. The solid circle at the end of a relationship line represents the target of a 'many' relationship. An open circle at the end of a relationship line indicates that the relationship is optional.

The E-Business LDM is organized into fifteen major subject areas titled: ADVERTISEMENT, CONTACT INFORMATION, ISP, ITEM, LOCATION, MULTIMEDIA COMPONENT, PARTY, PRIVACY, PROFILE, PROMOTION, TRANSACTION ACTIVITY, VENDOR, VISIT, WEB SERVER, WEB SITE. A brief description of each subject area follows:

Advertisement

The Advertisement Subject Area 601 determines the effectiveness of ad campaigns by collecting information on the cost of ads by type, and comparing this information with the number of times an exposure to the ad delivered a customer to a particular item or site.

Contact Information

The Contact Information subject area 605 stores contact information for customers & organizations, including mailing addresses, email addresses, and telephone numbers.

ISP

The ISP subject area 607 contains information covering all aspects of Internet Service Provider activity.

Item

The Item subject area 609 stores information concerning each piece of merchandise or each service provided by the E-business retailer. Included would be a description, how the item was classified, price, cost, the number in inventory, etc.

Location

The Location subject area 611 stores information on all physical and virtual sites owned or leased by the retailer to support the sale of goods, distribution, and storage. Would include kiosks, warehouses, offices, as well as internet sites.

Multimedia Component

The Multimedia Component subject area 613 stores multimedia elements that can be use to construct a web page, such as ads, catalogues, etc.

Party

The Party subject area 629 captures information about the users involved in web transactions and/or interactions. This area maintains information about customer's payment accounts, and household and organizational affiliations, and it maps customers to entries in the Profile Subject Area.

Privacy

The Privacy subject area 615 stores information about privacy permissions from individuals, households and organizations of interest to the enterprise.

Profile

The Profile subject area 617 stores information concerning customer segments of interest to the enterprise. This information is typically purchased from a third party.

Promotion

The Promotion subject area 619 contains information concerning promotions, which are defined as marketing efforts, which are different from normal practice and designed for a specific purpose. Information is stored on the various components of the promotion, including the items and ads included, the type of ad, and the market segments targeted.

Transaction Activity

The Transaction Activity subject area 623 stores information concerning a customer's interaction with the company involving the sale or return of an item and the price and discounts associated with that item. It maps customers to entries in the Address Area, the item(s) of interest, and the associate dealing with the customer.

Vendor

The Vendor subject area 625 stores information about parties from which the company purchases goods and services. This would include information concerning purchase orders, returns, and items shipped directly to the company or drop shipped to a customer.

Visit

The Visit subject area 627 stores information concerning a customer's history at a virtual store's web site. Included would be information about the ads that triggered the visit, the web pages browsed, and the items of interest to the consumer.

Web Server

The Web Server subject area 631 contains summary information, operational metrics and errors about the physical server devices servicing a given web visit by a customer.

Web Site

The Web Site Subject area 633 stores information about the company's web sites including page components, page generation, and web page type.

Additional details concerning the e-business industry logical data model described above are provided in U.S. patent application Ser. No. 09/990,539, titled "SYSTEM AND METHOD FOR CAPTURING AND STORING INFORMATION CONCERNING WEB VISITOR BROWSING ACTIVITIES IN A DATA WAREHOUSE," by Scott D. Carty et al. and filed on Nov. 16, 2001.

Logical Data Model Sharable Subject Areas

As can be seen in the two logical data model examples described above and illustrated in FIGS. 5 and 6, some of the subject areas in the two models are similarly named and described, including much of the same information. Corresponding subject areas included in the Communications and E-Business logical data models including similar information are ADVERTISEMENT subject areas 501 and 601, LOCATION subject areas 507 and 611, and PARTY subject areas 513 and 529.

As the number of industry Logical Data Models being sold and installed at customers' sites proliferates, the industry LDMs will become even more important than they are today—being the foundation that supports all data warehouse solutions. To simplify and improve LDM and data warehouse solution development, there is thus now a greater need than ever before to implement a common naming and data modeling standard across all industry LDMs, and instigate the utilization of sharable subject areas across industry LDMs An architecture for a logical data model utilizing sharable subject areas may include three conceptual layers:

1. The LOWEST level is maintained only once and may include subclasses for different industries. The lowest level would have subject areas containing the basic information that are common across two or more industries. For example, Location, Party, Geography, Customer, E-Biz, etc.

These sharable subject areas will be integrated into each industry LDM and delivered as one integrated LDM.

2. The MIDDLE level would be industry specific and may include sub-classing within industries, for example wire-line vs. wireless for the Communications industry. Each industry would have industry specific entities and attributes add-ons to the common subject areas.

Each industry may also have INDUSTRY "extensions" to each of the common subject areas. For example, the Retail LDM may have an INDUSTRY extension to Geography, e.g. Trading Zone.

3. The TOP level would be Customer Specific. This level is the customer level, and contains their implementation specific enhancements that may be proprietary to the customer.

Figure 7:
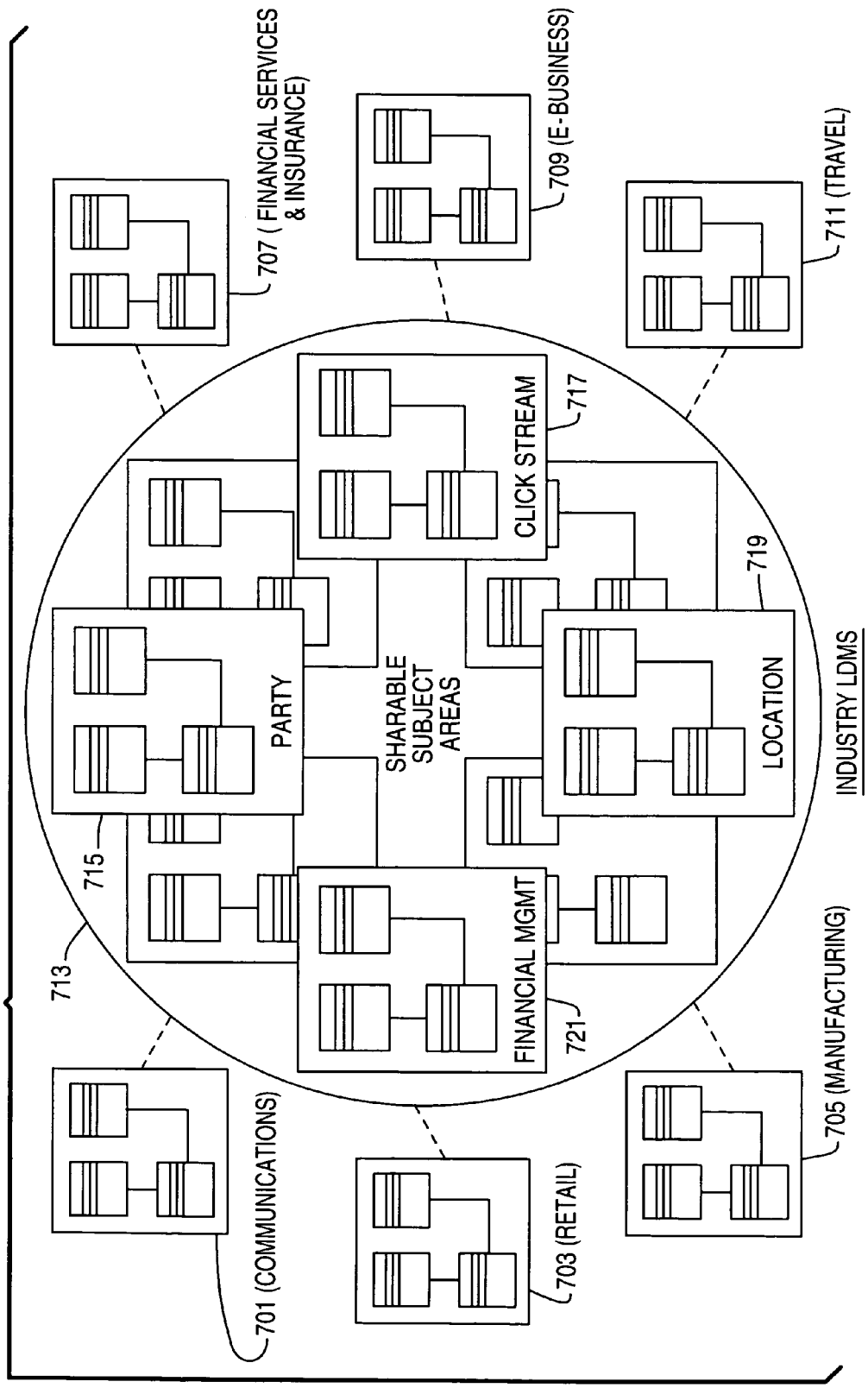
FIG. 7 provides an illustration of a shared subject area architecture in accordance with the present invention.

FIG. 7 provides an illustration of a shared subject area architecture, wherein component subject areas containing basic information common to two or more industries are utilized in the design and construction of logical data models for multiple industries and customers. Logical data models are illustrated for several industries including Communications 701, Retail 703, Manufacturing 705, Financial Services and Insurance 707, E-Business 709, and Travel 711. A portion of each one of these industry logical data models is constructed through use of one or more of the shared subject areas contained within the group 713. Examples of a few of the shared subject areas that can be constructed for use within two or more industry models include:

an advertisement subject area defining the manner in which information about sales, promotions and advertising is stored within a database;

a clickstream subject area 717 defining the manner in which information concerning web visitors and visitor web activity is stored within a database;

a financial management subject 721 area defining the manner in which financial information of interest to two or more industries is stored within a database;

a location subject area 719 defining the manner in which information concerning physical and virtual properties is stored within a database;

a party subject area 715 defining the manner in which information about any person, business, group, or association that is of business interest is stored within a database; and a privacy subject area defining the manner in which information about privacy permissions from individuals, households and organizations is stored within a database.

CONCLUSION

The Figures and description of the invention provided above reveal a new and useful method for constructing logical data models. Although examples of logical data models for the Communications and E-Business industries have been illustrated and described, the invention is not limited to use within those two industries. Similarly, although examples of shared subject areas for Party information, Clickstream information, Location information, Financial Management information and Advertisement information have been described, many other shared subject areas are possible within the scope of the present invention.

A logical data model design methodology utilizing shared subject areas provides for more effective new LDM development through re-use of common elements and quicker deployment of horizontal applications on all industries. Shared subject areas enable Professional Services (PS) consultants who work with multiple LDMs to leverage knowledge across LDMs and facilitate customer/PS combining of LDMs.

Shared subject areas represent "configurable" LDM components that facilitate the development of hybrid business models. For example, a communications company that has retail store outlets to sell wireless services crosses the retail and communications LDMs. A component based architecture allows easy configuration of LDMs for more complex business models.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for constructing a data warehouse for a customer within a specific industry, said method comprising the steps of:

selecting at least one shared subject area from a plurality of predefined shared subject areas for inclusion in a logical data model for said data warehouse, each one of said predefined shared subject areas comprising a plurality of entities and relationships defining the manner in which basic information common to two or more industries is stored within a database; and populating said data warehouse with data in accordance with said logical data model.

2. The method for constructing a data warehouse for a customer within a specific industry in accordance with claim 1, said method further comprising the step of:

including industry specific entities and attributes add-ons to said selected shared subject area within said logical data model for said data warehouse.

3. The method for constructing a data warehouse for a customer within a specific industry in accordance with claim 1, said method further comprising the step of:

including an industry specific extension to said selected shared subject area within said logical data model for said data warehouse.

4. The method for constructing a data warehouse for a customer within a specific industry in accordance with claim 1, wherein said specific industry comprises one member of the group of industries comprising:

communications;
retail;
manufacturing;
financial services;
insurance;
e-business;
travel; and
transportation.

5. The method for constructing a data warehouse for a customer within a specific industry in accordance with claim 1, wherein said at least one shared subject area comprises at least one member of the group of predefined subject areas comprising:

an advertisement subject area defining the manner in which information about sales, promotions and advertising of interest to two or more industries is stored within a database;

a clickstream subject area defining the manner in which information concerning web visitors and visitor web activity of interest to two or more industries is stored within a database;

a financial management subject area defining the manner in which financial information of interest to two or more industries is stored within a database;

a location subject area defining the manner in which information concerning physical and virtual properties of interest to two or more industries is stored within a database;

a party subject area defining the manner in which information about any person, business, group, or association that is of business interest to two or more industries is stored within a database; and a privacy subject area defining the manner in which information about privacy permissions from individuals, households and organizations of interest to two or more industries is stored within a database.

6. A data warehouse system for a customer within a specific industry, comprising:

a processor a relational database for holding information, said information being organized within said relational database in accordance with a logical data model;

said logical data model including a plurality of subject areas, each one of said subject areas including entities and relationships defining the manner in which subsets of said information is stored and organized within said data warehouse; and said plurality of subject areas including at least one shared subject area selected from a plurality of predefined shared subject areas, each one of said predefined shared subject area comprising a plurality of entities and relationships defining the manner in which basic information common to two or more industries is stored within a database.

7. The data warehouse system for a customer within a specific industry in accordance with claim 6, wherein:

said logical data model further includes industry specific entities and attributes add-ons included in said at least one shared subject area.

8. The data warehouse for a customer within a specific industry in accordance with claim 6, wherein:

said logical data model further includes an industry specific extension appended to said at least one shared subject area.

9. The data warehouse for a customer within a specific industry in accordance with claim 6, wherein said specific industry comprises one member of the group of industries comprising:

communications;
retail;
manufacturing;
financial services;
insurance;
e-business;
travel; and
transportation.

10. The data warehouse for a customer within a specific industry in accordance with claim 6, wherein said at least one shared subject area comprises at least one member of the group of predefined subject areas comprising:

an advertisement subject area defining the manner in which information about sales, promotions and advertising of interest to two or more industries is stored within a database;

a clickstream subject area defining the manner in which information concerning web visitors and visitor web activity of interest to two or more industries is stored within a database;

a financial management subject area defining the manner in which financial information of interest to two or more industries is stored within a database;

a location subject area defining the manner in which information concerning physical and virtual properties of interest to two or more industries is stored within a database;

a party subject area defining the manner in which information about any person, business, group, or association that is of business interest to two or more industries is stored within a database; and a privacy subject area defining the manner in which information about privacy permissions from individuals, households and organizations of interest to two or more industries is stored within a database.

* * * * *